(12) United States Patent
Wu

(10) Patent No.: US 11,751,164 B2
(45) Date of Patent: *Sep. 5, 2023

(54) METHOD AND DEVICE FOR DETERMINING PAGING LOCATION OR CAMPING LOCATION

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,784

(22) Filed: Dec. 8, 2021

(65) Prior Publication Data
US 2022/0104171 A1 Mar. 31, 2022

Related U.S. Application Data

(63) Continuation of application No. 16/954,497, filed as application No. PCT/CN2018/125463 on Dec. 29, 2018, now Pat. No. 11,229,005.

(30) Foreign Application Priority Data

Jan. 3, 2018 (CN) .......................... 201810005096.9

(51) Int. Cl.
*H04W 68/00* (2009.01)
*H04W 48/08* (2009.01)
*H04W 48/16* (2009.01)

(52) U.S. Cl.
CPC ......... *H04W 68/005* (2013.01); *H04W 48/08* (2013.01); *H04W 48/16* (2013.01)

(58) Field of Classification Search
CPC .... H04W 48/08; H04W 48/06; H04W 68/005
USPC .......................................................... 455/434
See application file for complete search history.

(56) References Cited

U.S. PATENT DOCUMENTS

| 2016/0119895 | A1 | 4/2016 | Agiwal et al. |
| 2016/0234804 | A1 | 8/2016 | Hu et al. |
| 2017/0367069 | A1 | 12/2017 | Agiwal et al. |
| 2019/0110278 | A1* | 4/2019 | Liu ............... H04W 68/025 |

(Continued)

FOREIGN PATENT DOCUMENTS

| CN | 104811279 A | 7/2015 |
| CN | 106170930 A | 11/2016 |

(Continued)

OTHER PUBLICATIONS

Chinese Search Report dated Dec. 3, 2020 as received in application No. 201810005096.9.

(Continued)

*Primary Examiner* — Ted M Wang
(74) *Attorney, Agent, or Firm* — Maschoff Brennan

(57) ABSTRACT

The embodiments of the present disclosure provide a method and a device for determining paging location or camping location. The method includes: determining information of a first location on which the UE camps or receives a paging message, wherein the information of the first location indicates a location of a bandwidth part (BWP) or a beam; and camping on or receiving the paging message on a corresponding BWP or beam according to the information of the first location.

20 Claims, 7 Drawing Sheets

(56) References Cited

U.S. PATENT DOCUMENTS

| | | | |
|---|---|---|---|
| 2019/0149383 A1* | 5/2019 | Ko | .................. H04J 11/0069 370/329 |
| 2020/0280955 A1 | 9/2020 | Liu | |
| 2020/0296656 A1 | 9/2020 | Amuru et al. | |
| 2020/0404617 A1 | 12/2020 | Murray et al. | |

FOREIGN PATENT DOCUMENTS

| | | |
|---|---|---|
| CN | 107079404 A | 8/2017 |
| CN | 109451847 A | 3/2019 |
| KR | 20170024591 A | 3/2017 |
| WO | 2017176438 A1 | 10/2017 |

OTHER PUBLICATIONS

"Remaining issues on multi-carrier paging in NB-IoT" 3GPP TSG-RAN WG2 Meeting#96, R2-167683 Reno, USA, Nov. 14-18, 2016, ZTE.

"Design Considerations for Paging in NR" 3GPP TSG-RAN WG1 Meeting #90Bis, R1-1718758, Prague, Czech Republic, Oct. 9-13, 2017, Convida Wireless.

Non-Final Office Action dated May 27, 2021 as received in U.S. Appl. No. 16/695,497.

International Search Report and Written Opinion dated Jul. 16, 2020 as received in application No. PCT/CN2018/125463.

Indian Office Action dated Aug. 16, 2021 as received in application No. 2020027028642.

European Search Report dated Jan. 19, 2021 as received in application No. 18899002.2.

"Evolved Universal Terrestria Radio Access (E-UTRA)" 3GPP TS 36.304, Technical Specification Group Radio Access Network. Mar. 2016.

"Correction to paging carrier selection formula in Rel-14 NB-IoT" 3GPP TSG-RAN WG2 Meeting #98, R2-1704181, May 15, 2017. Ericsson.

Chinese Office Action dated Mar. 4, 2020 as received in application No. 201810005096.9.

* cited by examiner

METHOD AND DEVICE FOR DETERMINING PAGING LOCATION OR CAMPING LOCATION

CROSS-REFERENCE TO RELATED APPLICATION

The present application is a continuation application of U.S. application Ser. No. 16/954,497 filed on Jun. 16, 2020, which is the U.S. national phase of PCT Application No. PCT/CN2018/125463 filed on Dec. 29, 2018, and claims priority to Chinese Patent Application No. 201810005096.9 filed on Jan. 3, 2018, the disclosures of which are incorporated in their entirety by reference herein.

TECHNICAL FIELD

The present disclosure relates to the field of communications technology, and in particular to a method and a device for determining paging location or camping location.

BACKGROUND

With the development of mobile communications technology, more and more technologies have been introduced to improve communication efficiency. For example:

(1) Introduction to Bandwidth Part (BWP):

In the fifth-generation (5G) mobile communication system, a User Equipment (UE) may only support a relative small working bandwidth (such as 5 MHz), while a cell on the network side may support a relatively large bandwidth (such as 100 MHz), and the small bandwidth in this large bandwidth in which the UE works are considered as a BWP.

The network side configures one or more BWPs for the UE, and changes the BWP in which the UE may works by activating or deactivating the BWP.

The network side will configure a default BWP. When the UE works in another BWP in the cell, the network side may configure a timer for the UE. When the timer expires, the UE will switch back to the default BWP.

(2) Introduction to Paging Message:

The content of the paging message is mainly used to indicate the updating of the system information and the arrival of the service for the UE.

The UE receives the paging message through discontinuous reception (DRX) in an idle state or an inactive state. The location information of the UE receiving the paging message includes:

Paging Frame (PF): it is a radio frame number, and may contain one or more Paging Occasions (POs).

PO: it is a subframe number, in which the paging message is scheduled by the Paging Radio Network Temporary Identity (P-RNTI) in the Physical Downlink Control Channel (PDCCH).

The locations of PF and PO are calculated by the UE according to its UE_ID (for example, an International Mobile Subscriber Identity (IMSI)). The DRX cycle for the UE to receive the paging message is determined by the shorter of the broadcast paging cycle in the system information and the UE-specific paging cycle.

(3) Introduction to Synchronous Signal Block (SSB):

A SSB includes: a Primary Synchronous Signal (PSS), a Secondary Synchronous Signal (SSS), and a Physical Broadcast Channel (PBCH). To synchronize with a cell (including time synchronization and frequency synchronization) and acquire corresponding timing relationship (including the subframe number and the System Frame Number (SFN)), the UE needs to read the cell-specific SSB, which is called a SSB defined by a cell.

(4) Instruction to Multi-Beam:

In the future 5G system, in order to achieve the target of the downlink transmission rate of 20 Gbps and the uplink transmission rate of 10 Gbps, high-frequency communication and large-scale antenna technology will be introduced. High-frequency communication can provide a wider system bandwidth, and the antenna size can be smaller, which is more conducive to the deployment of large-scale antennas in base stations and UEs. Multi-beam/multi-TRP transmission and reception on the base station side, and multi-beam transmission and reception on the UE side will be widely used. Taking the Physical Uplink Sharing Channel (PUSCH) of New Radio (NR) as an example, refer to FIG. 1, it shows the process of uplink multi-beam transmission. The system shown in FIG. 1 includes a UE 11, a TRP 12, a first PUSCH 13 and a second PUSCH 14.

However, when the UE is in the idle or inactive state, it may camp or receive paging messages on a specific BWP or beam. In a case that there are multiple BWPs or beams in a cell on which the UE can camp or receive paging messages, on which BWP or beam the UE camps or receives paging messages is a problem that needs to be solved.

SUMMARY

According to a first aspect of the present disclosure, a method for determining paging location or camping location applied to a user equipment (UE) is provided. The method includes: determining information of a first location on which the UE camps or receives a paging message, wherein the information of the first location indicates a location of a bandwidth part (BWP) or a beam; and camping on or receiving the paging message on a corresponding BWP or beam according to the information of the first location; wherein the determining the information of the first location on which the UE camps or receives a paging message comprises: receiving assistance information sent by a network-side device, the assistance information being contained in a broadcast message or an dedicated message; and determining the information of the first location on which the UE camps or receives the paging message according to the assistance information.

According to a second aspect of the present disclosure, a method for determining paging location or camping location applied to a network-side device is further provided. The method includes: determining information of a first location on which a UE camps or receives a paging message, wherein the information of the first location indicates a location of a bandwidth part (BWP) or a beam; and sending the paging message on a corresponding BWP or beam according to the information of the first location.

According to a third aspect of the present disclosure, a user equipment (UE) is further provided, which includes: a first determination module configured to determine information of a first location on which the UE camps or receives a paging message, wherein the information of the first location indicates a location of a bandwidth part (BWP) or a beam; and a first reception module configured to camp on or receive the paging message on a corresponding BWP or beam according to the information of the first location.

According to a fourth aspect of the present disclosure, a network-side device is further provided, which includes: a second determination module configured to determine information of a first location on which a UE camps or receives a paging message, wherein the information of the first location indicates a location of a bandwidth part (BWP) or a beam; and a first sending module configured to send the paging message on a corresponding BWP or beam according to the information of the first location.

According to a fifth aspect of the present disclosure, a user equipment is further provided, which includes: a processor, a storage, and a computer program stored on the storage and capable of running on the processor, the computer program performing, when executed by the processor, the steps of the method for determining paging location or camping location according to the first aspect.

According to a sixth aspect of the present disclosure, a network-side device is further provided, which includes: a processor, a storage, and a computer program stored on the storage and capable of running on the processor, the computer program performing, when executed by the processor, the steps of the method for determining paging location or camping location according to the second aspect.

According to a seventh aspect of the present disclosure, a computer readable storage medium is further provided, the computer readable storage medium having a computer program stored thereon, the computer program performing, when executed by a processor, the steps of the method for determining paging location or camping location according to the first aspect; or the steps of the method for determining paging location or camping location according to the second aspect.

BRIEF DESCRIPTION OF THE DRAWINGS

By reading the detailed description of the preferred embodiments below, various other advantages and benefits will become apparent to those of ordinary skill in the art. The drawings are only for the purpose of showing the preferred embodiments, and are not considered as limitations to the present disclosure. Furthermore, like reference numerals are used to denote like parts throughout the drawings. In the drawings.

DETAILED DESCRIPTION

The technical solutions in the embodiments of the present disclosure will be described clearly and thoroughly in conjunction with the drawings in the embodiments of the present disclosure. Obviously, the described embodiments are some of the embodiments of the present disclosure, but not all of the embodiments. Based on the embodiments in the present disclosure, all other embodiments obtained by those of ordinary skill in the art without paying any creative work fall within the protection scope of the present disclosure.

The term "comprising" and any variations thereof in the description and claims of this application are intended to cover non-exclusive inclusions, for example, a process, a method, a system, a product or a device that includes a series of steps or units need not be limited to those steps or units that are explicitly listed, but may include other steps or units that are not explicitly listed or inherent to the process, the method, the product, or the device. In addition, "and/or" is used in the description and claims to mean at least one of the connected objects, for example, "A and/or B" means that there are three cases including A alone, B alone, and both A and B.

In the embodiments of the present disclosure, the words "exemplary" or "for example" are used to indicate examples, illustrations or explanations. Any embodiment or design described in the embodiments of the present disclosure as "exemplary" or "for example" should not be construed as more preferred or advantageous than other embodiments or designs. Rather, the use of the words "exemplary" or "for example" is intended to present related concepts in a specific manner.

Figure 1:
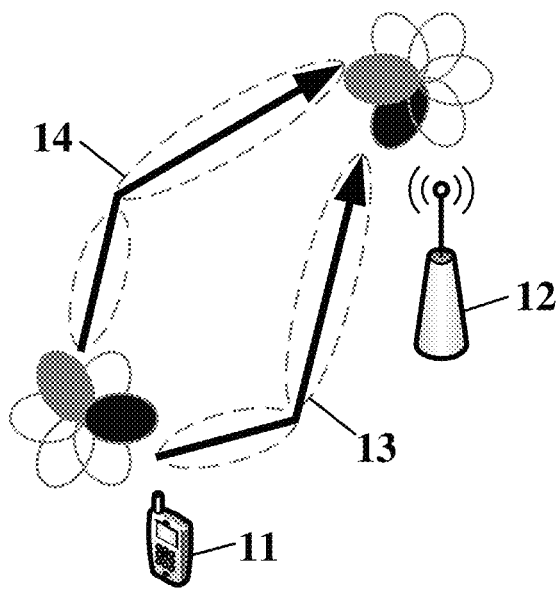
FIG. 1 is a diagram of a process of uplink multi-beam transmission.
Figure 2:
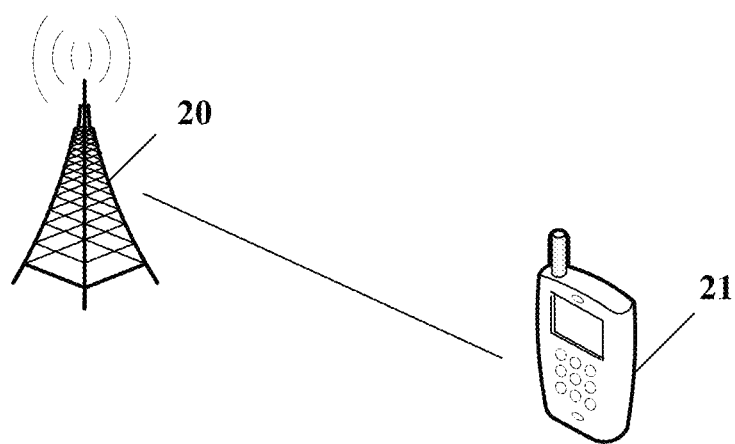
FIG. 2 is a diagram of an architecture of a wireless communication system according to an embodiment of the present disclosure.

The embodiments of the present disclosure will be described below with reference to the drawings. The method and device for sending/receiving paging message provided by the embodiments of the present disclosure can be applied to a wireless communication system. The wireless communication system may be a system using the fifth generation mobile communications technology (hereinafter referred to as 5G systems for short). Referring to FIG. 2, it is a diagram of an architecture of a wireless communication system according to an embodiment of the present disclosure. As shown in FIG. 2, the wireless communication system may include: a network-side device 20 and a user equipment. For example, the user equipment is referred to as UE 21. The UE 21 can communicate with the network-side device 20. In practical applications, the connection between the above devices may be a wireless connection. To conveniently and intuitively represent the connection relationship between the devices, solid lines are used in FIG. 2.

It should be noted that the above communication system may include multiple UEs, and the network-side device may communicate with multiple UEs (transmitting signaling or data).

The network-side device provided in the embodiments of the present disclosure may be a base station. The network-side device may be a commonly used base station, or an evolved node base station (eNB), or may be a network-side device in a 5G system (e.g., the next generation node base station (gNB) or the transmission and reception point (TRP)), or the like.

The user equipment provided in the embodiments of the present disclosure may be a mobile phone, a tablet, a notebook, an Ultra-Mobile Personal Computer (UMPC), a netbook, or a Personal Digital Assistant (PDA).

Figure 3:
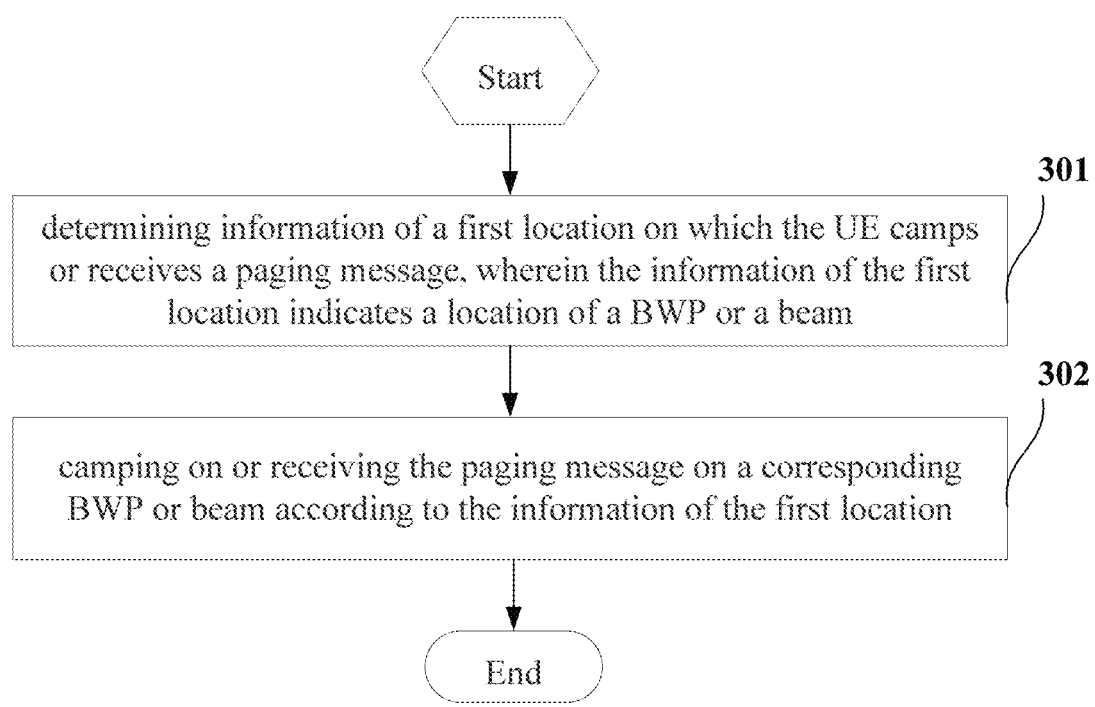
FIG. 3 is a first flowchart of a method for determining paging location or camping location according to an embodiment of the present disclosure.

Referring to FIG. 3, it shows a flow of a method for determining paging location or camping location according to an embodiment of the present disclosure. The method may be executed by a UE, and may include the following steps:

Step 301, determining information of a first location on which the UE camps or receives a paging message, wherein the information of the first location indicates a location of a BWP or a beam;

in an embodiment of the present disclosure, the information of the first location includes arbitrary combination of one or more of: frequency location information and spatial location information.

In an embodiment of the present disclosure, the frequency location information includes arbitrary combination of one or more of: a BWP identifier, a Sub-Carrier Space (SCS) identifier, a frequency identifier, a frequency offset identifier, a bandwidth identifier, a Physical Resource Block (PRB) identifier and a PRB offset identifier (e.g., corresponding to the offset of a certain reference PRB (such as PRB of number 0) in the cell).

In an embodiment of the present disclosure, the spatial location information includes arbitrary combination of one or more of: a reference signal identifier, a Synchronization Signal Block (SSB) Identifier, a Channel State Information-Reference Signal (CSI-RS) identifier, a beam identifier, a beam pair identifier, and a transmission node identifier.

Step 302, camping on or receiving the paging message on a corresponding BWP or beam according to the information of the first location.

In this way, it can be achieved that the network side sends a paging message on multiple different BWPs or beams in a cell, and allocates different UEs to different BWPs or beams to camp thereon or to receive the paging message thereon, thereby balancing the paging message sending load.

Figure 4:
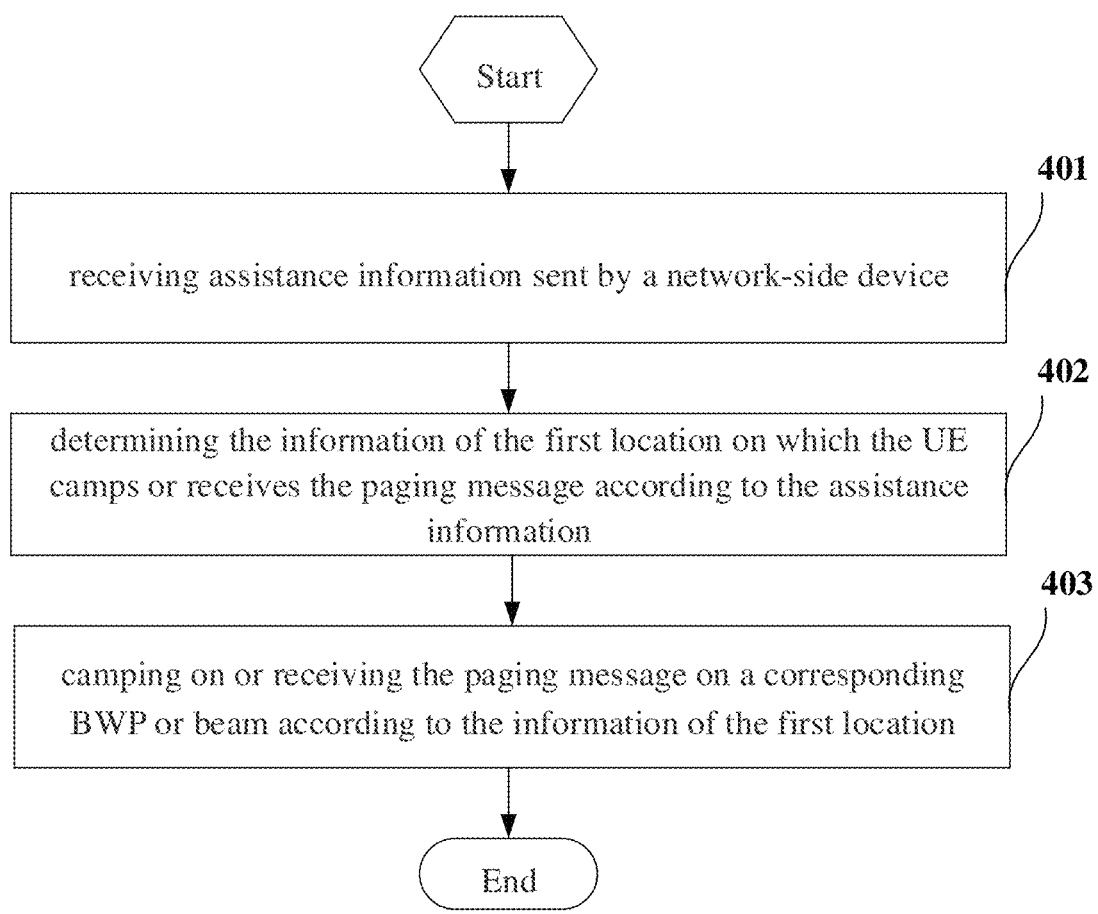
FIG. 4 is a second flowchart of a method for determining paging location or camping location according to an embodiment of the present disclosure.

Referring to FIG. 4, it shows a flow of another method for determining paging location or camping location in an embodiment of the present disclosure. The method may be executed by a UE, and has the following specific steps:

Step 401, receiving assistance information sent by a network-side device;

for example: receiving a broadcast message (e.g., a Master Information Block (MIB), a System Information Block (SIB), etc.) sent by the network-side device, the broadcast message including the assistance information; or, for example: receiving an dedicated message (e.g., a Radio Resource Control Reconfiguration (RRC Reconfiguration) message, a Radio Resource Control Release (RRC Release) message, etc.) sent by the network-side device, the dedicated message including the assistance information. Obviously, it will be appreciated that the manner for receiving the assistance information is not specifically limited in the embodiment of the disclosure.

In an embodiment of the present disclosure, the assistance information may include information of a second location which allows camping or sending the paging message thereon.

It should be noted that, the information of the first location and the information of the second location are not intended to describe a specific order of the location information. In an embodiment of the present disclosure, with the information of the second location to be able to camp thereon or send the paging message thereon, the information of the first location to be able to camp thereon or send the paging message thereon can be determined.

Further, the assistance information includes arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

In an embodiment of the present disclosure, the BWP which allows camping or sending the paging message thereon is arbitrary combination of one or more of: a BWP containing a synchronization signal block (SSB) defined by a cell, a BWP for initial cell access, and a BWP containing system information.

In an embodiment of the present disclosure, the UE identity includes any one of: an International Mobile Subscriber Identity (IMSI), a System Architecture Evolution (SAE) Temporary Mobile Station Identifier (S-TMSI), a UE resume identifier (resumeID) for identifying an INACTIVE state of the UE, a Cell Radio Network Temporary Identifier (C-RNTI), a random number, and a fixed value (such as "0"). Obviously, it will be appreciated that the specific values for the random number and the fixed value are not specifically limited.

In an embodiment of the present disclosure, the information of the second location includes arbitrary combination of one or more of: frequency location information and spatial location information.

Step 402, determining the information of the first location on which the UE camps or receives the paging message according to the assistance information;

in an embodiment of the present disclosure, the information of the first location includes arbitrary combination of one or more of: frequency location information and spatial location information.

In an embodiment of the present disclosure, the frequency location information includes arbitrary combination of one or more of: a BWP identifier, a Sub-Carrier Space (SCS) identifier, a frequency identifier, a frequency offset identifier, a bandwidth identifier, a Physical Resource Block (PRB) identifier and a PRB offset identifier (e.g., corresponding to the offset of a certain reference PRB (such as PRB of number 0) in the cell).

In an embodiment of the present disclosure, the spatial location information includes arbitrary combination of one or more of: a reference signal identifier, a Synchronization Signal Block (SSB) Identifier, a Channel State Information-Reference Signal (CSI-RS) identifier, a beam identifier, a beam pair identifier, and a transmission node identifier.

Step 403, camping on or receiving the paging message on a corresponding BWP or beam according to the information of the first location.

In an embodiment of the present disclosure, Step 402 may determine the information of the first location in the manners as follows (including manner I, manner II, manner III and manner IV). In manners I and II, the information of the first location is the frequency location information of a BWP to camp or to receive the paging message thereon; in manners III and IV, the information of the first location is the spatial location information of a beam to camp or to receive the paging message thereon. Specifically, Manner I, calculating frequency location information of one or more BWPs on which the UE camps or receives the paging message, according to one or more of: a UE identity, a paging cycle of UE, the number of BWPs which allow camping or sending the paging message thereon, and a camping weight or a paging weight of each BWP; for example, the frequency location information of the BWP may be the BWP identifier.

Example 1: the identifier n ($0 \leq n \leq (N_n-1)$) of the BWP for camping or receiving the paging message is the minimum from the values of n that satisfy the following formula:

$$(\text{floor}(UE\_ID/(N \times N_s))) \bmod W < (W(0) + W(1) + \ldots + W(n))$$

where, UE_ID: IMSI mod x (e.g., x=1024, x is configured by network or agreed by protocol);

Nn−1: the total number of the BWPs in the cell which allow camping or sending the paging message thereon minus 1;

W(i): the camping weight or the paging weight of each BWP (BWP_i), which may be configured by network side or agreed by protocol;

W: the total camping weight or total paging weight of all the BWPs in the cell which allow camping or sending the paging message thereon, i.e., W=W(0)+W(1)+ . . . +W(Nn−1);

Nn: the total number of the BWPs in the cell which allow camping or sending the paging message thereon;

N: min(T, nB);

Ns: max(1, nB/T);

T: the paging cycle of the UE;

nB: it may be 4T, 2T, T, T/2, T/4, T/8, T/16, T/32, T/64, T/128, etc.; nB may be configured by network side or agreed by protocol.

Example 2: the identifier n (0≤n≤(Nn−1)) of the BWP for camping or receiving the paging message is the minimum from the values of n that satisfy the following formula:

$$(\text{floor}(UE\_ID/(N \times Ns)) \bmod Nn) < (n+1);$$

Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

N: min(T, nB);

Ns: max(1, nB/T);

T: the paging cycle of the UE;

nB: it may be 4T, 2T, T, T/2, T/4, T/8, T/16, T/32, T/64, T/128, etc.; nB may be configured by network side or agreed by protocol.

Example 3: the identifier n (0≤n≤(Nn−1)) of the BWP for camping or receiving the paging message is the minimum from the values of n that satisfy the following formula:

$$(UE\_ID \bmod Nn) < (n+1);$$

where, Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

Nn: the total number of the BWPs in the cell which allow camping or sending the paging message thereon.

Example 4: the identifier n (0≤n≤(Nn−1)) of the BWP for camping or receiving the paging message is a value of n that satisfies the following formula:

$$(\text{floor}(UE\_ID/(N \times Ns)) \bmod Nn) = n;$$

where, Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

Nn: the total number of the BWPs in the cell which allow camping or sending the paging message thereon;

N: min(T, nB);

Ns: max(1, nB/T);

T: the paging cycle of the UE;

nB: 4T, 2T, T, T/2, T/4, T/8, T/16, T/32, T/64, T/128, etc.; nB may be configured by network side or agreed by protocol.

Example 5: the identifier n (0≤n≤(Nn−1)) of the BWP for camping or receiving the paging message is a value of n that satisfies the following formula:

$$(UE\_ID \bmod Nn) = n;$$

where, Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

Nn: the total number of the BWPs in the cell which allow camping or sending the paging message thereon.

Manner II, selecting randomly frequency location information of a BWP from frequency location information of multiple BWPs which allow camping or sending the paging message thereon, as the frequency location information of the BWP on which the UE camps or receives the paging message.

Example: the identifier n (0≤n≤(Nn−1)) of the BWP for camping or receiving the paging message is selected by the UE from Nn BWPs randomly, where Nn is the total number of the BWPs in the cell which allow camping or sending the paging message thereon.

Manner III, calculating spatial location information of one or more beams on which the UE camps or receives the paging message, according to one or more of: the UE identity, the paging cycle of UE, the number of beams which allow camping or sending the paging message thereon, and a camping weight or a paging weight of each beam.

Example 1: the identifier m (0≤m≤(Nm−1)) of the beam for camping or receiving the paging message is the minimum from the values of m that satisfy the following formula:

$$(\text{floor}(UE\_ID/(N \times Ns)) \bmod W) < (W(0)+W(1)+ \ldots +W(m))$$

where, UE_ID: IMSI mod x (e.g., x=1024, x is configured by network or agreed by protocol);

Nm−1: the total number of the beams in the cell which allow camping or sending the paging message thereon minus 1;

W(i): the camping weight or the paging weight of each beam (beam_i), which may be configured by network side or agreed by protocol;

W: the total camping weight or total paging weight of all the beams in the cell which allow camping or sending the paging message thereon, i.e., W=W(0)+W(1)+ . . . +W(Nm−1);

Nm: the total number of the beams in the cell which allow camping or sending the paging message thereon;

N: min(T, mB);

Ns: max(1, mB/T);

T: the paging cycle of the UE;

mB: 4T, 2T, T, T/2, T/4, T/8, T/16, T/32, T/64, T/128, etc.; mB may be configured by network side or agreed by protocol.

Example 2: the identifier m (0≤m≤(Nm−1)) of the beam for camping or receiving the paging message is the minimum from the values of m that satisfy the following formula:

$$(\text{floor}(UE\_ID/(N \times Ns)) \bmod Nm) < (m+1);$$

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

N: min(T, mB);

Ns: max(1, mB/T);

T: the paging cycle of the UE;

mB: it may be any one of 4T, 2T, T, T/2, T/4, T/8, T/16, T/32, T/64, T/128, etc.; mB may be configured by network side or agreed by protocol.

Example 3: the identifier m (0≤m≤(Nm−1)) of the beam for camping or receiving the paging message is the minimum from the values of m that satisfy the following formula:

(UE_ID mod $Nm$)<($m$+1);

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

Nm: the total number of the beams in the cell which allow camping or sending the paging message thereon.

Example 4: the identifier m (0≤m≤(Nm−1)) of the beam for camping or receiving the paging message is a value of m that satisfies the following formula:

(floor(UE_ID/($N$×$Ns$))mod $Nm$)=$m$;

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

Nm: the total number of the beams in the cell which allow camping or sending the paging message thereon;

N: min(T, mB);

Ns: max(1, mB/T);

T: the paging cycle of the UE;

mB: it may be any one of 4T, 2T, T, T/2, T/4, T/8, T/16, T/32, T/64, T/128, etc.; mB may be configured by network side or agreed by protocol.

Example 5: the identifier m (0≤m≤(Nm−1)) of the beam for camping or receiving the paging message is a value of m that satisfies the following formula:

(UE_ID mod $Nm$)=$m$;

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

Nm: the total number of the beams in the cell which allow camping or sending the paging message thereon.

Manner IV, selecting randomly spatial location information of a beam from spatial location information of multiple beams which allow camping or sending the paging message thereon, as the spatial location information of the beam to camp or to receive the paging message.

Example: the identifier m (0≤m≤(Nm−1)) of the beam for camping or receiving the paging message is selected by the UE from Nm beams randomly, where Nm is the total number of the beams in the cell which allow camping or sending the paging message thereon.

In this way, it can be achieved that the network side sends a paging message on multiple different BWPs or beams in a cell, and allocates different UEs to different BWPs or beams to camp or receive the paging message thereon, thereby balancing the paging message sending load.

Figure 5:
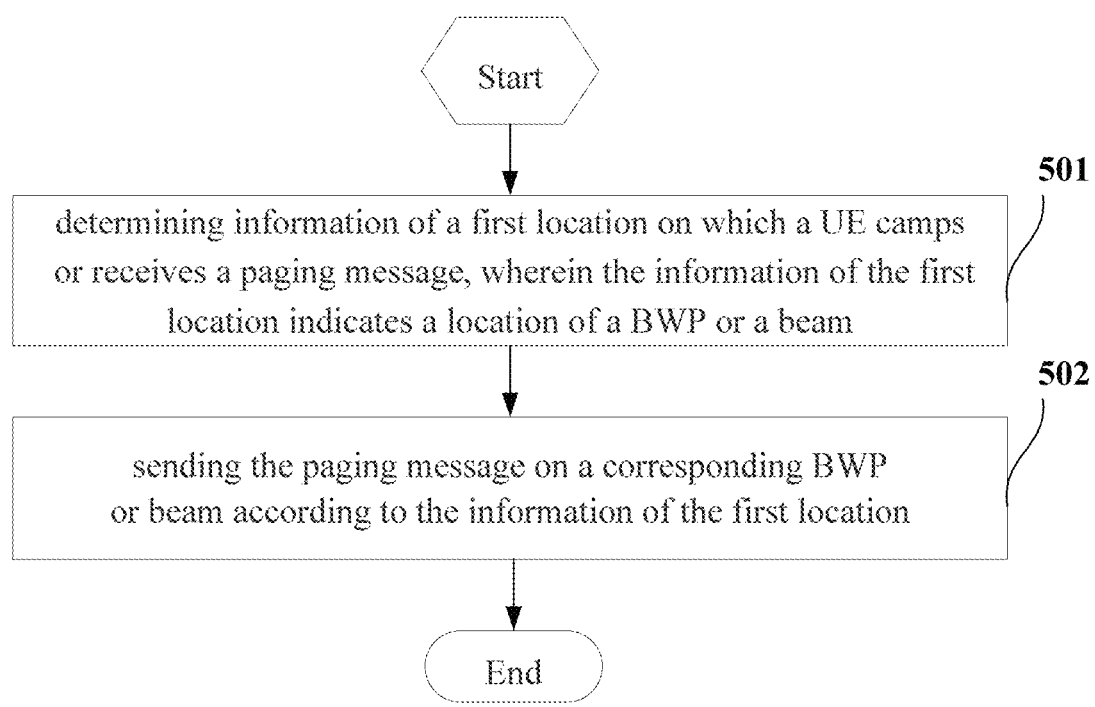
FIG. 5 is a first flowchart of a method for determining paging location or camping location according to an embodiment of the present disclosure.

Referring to FIG. 5, it shows a flow of a method for determining paging location or camping location in an embodiment of the present disclosure. The method is executed by a network-side device, and has the following specific steps:

Step 501, determining information of a first location on which a UE camps or receives a paging message, wherein the information of the first location indicates a location of a BWP or a beam;

In an embodiment of the present disclosure, the information of the first location includes arbitrary combination of one or more of: the frequency location information and the spatial location information.

In an embodiment of the present disclosure, the frequency location information includes arbitrary combination of one or more of: a BWP identifier, a SCS identifier, a frequency identifier, a frequency offset identifier, a bandwidth identifier, a PRB identifier and a PRB offset identifier (e.g., corresponding to the offset of a certain reference PRB (such as PRB of number 0) in the cell).

In an embodiment of the present disclosure, the spatial location information includes arbitrary combination of one or more of: a reference signal identifier, a SSB Identifier, a CSI-RS identifier, a beam identifier, a beam pair identifier, and a transmission node identifier.

Step 502, sending the paging message on a corresponding BWP or beam according to the information of the first location.

For example: sending the paging message on a corresponding frequency location and/or spatial location according to the frequency location information and/or the spatial location information corresponding to a location on which the UE camps or receives the paging message.

When the network-side device determines that there are multiple pieces of frequency location information corresponding to locations on which the UE camps or receives the paging message in a cell, the network-side device may send the paging message for the UE on all corresponding multiple frequency locations (e.g., BWPs).

When the network-side device determines that there are multiple pieces of spatial location information corresponding to locations on which the UE camps or receives the paging message in a cell, the network-side device may send the paging message for the UE on all corresponding multiple spatial locations (e.g., beams).

In this way, it can be achieved that the network side sends a paging message on multiple different BWPs or beams in a cell, and allocates different UEs to different BWPs or beams to camp or receive the paging message thereon, thereby balancing the paging message sending load.

Figure 6:
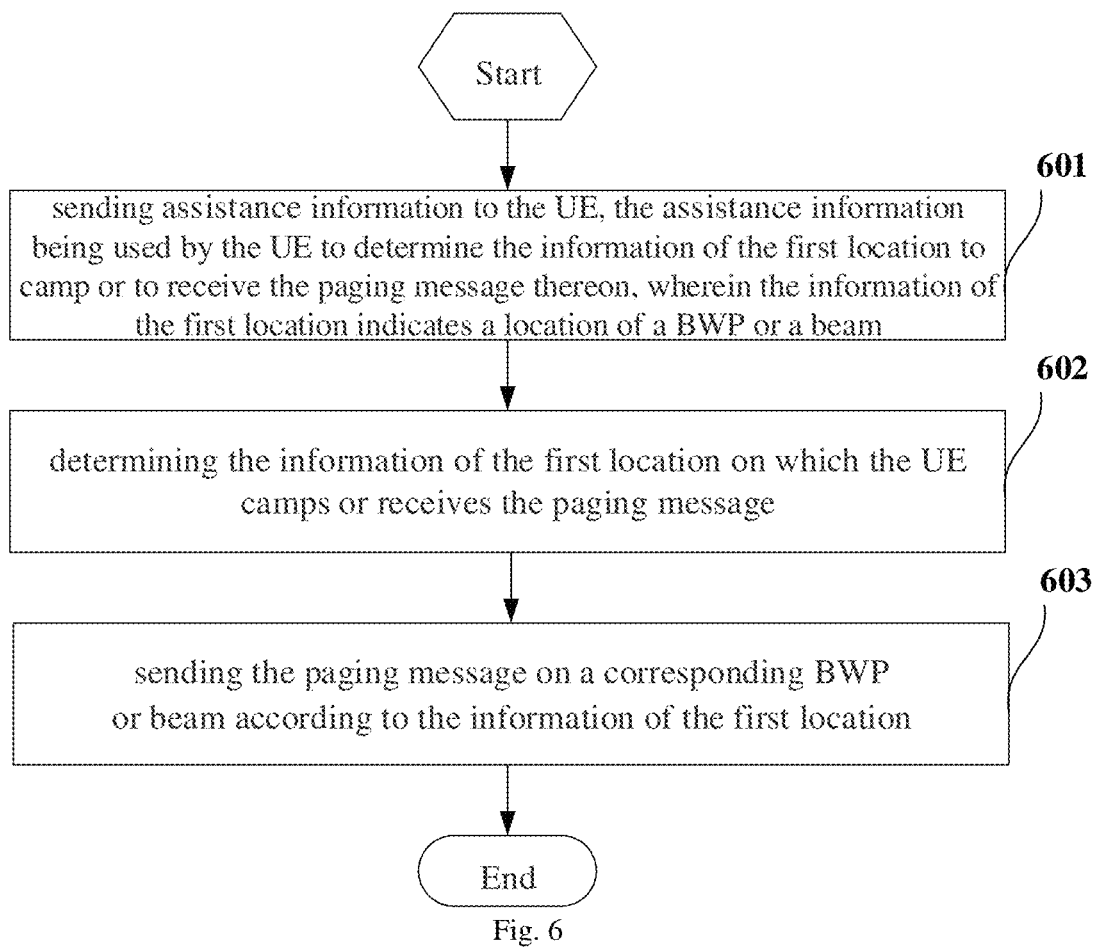
FIG. 6 is a second flowchart of a method for determining paging location or camping location according to an embodiment of the present disclosure.

Referring to FIG. 6, it shows a flow of a method for determining paging location or camping location in an embodiment of the present disclosure. The method is executed by a network-side device, and has the following specific steps:

Step 601, sending assistance information to the UE, the assistance information being used by the UE to determine the information of the first location to camp or to receive the paging message thereon, wherein the information of the first location indicates a location of a BWP or a beam;

for example: sending a broadcast message (e.g., an MIB, an SIB, etc.) to the UE, the broadcast message including the assistance information; or, for example: sending an dedicated message (e.g., an RRC Reconfiguration message, an RRC Release message, etc.) to the UE, the dedicated message including the assistance information.

In an embodiment of the present disclosure, the assistance information may include information of a second location of a BWP or a beam which allows camping or sending the paging message thereon. Further, the assistance information further includes arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

In an embodiment of the present disclosure, the BWP which allows camping or sending the paging message thereon is arbitrary combination of one or more of: a BWP containing a synchronization signal block (SSB) defined by a cell, a BWP for initial cell access, and a BWP containing system information.

In an embodiment of the present disclosure, the UE identity includes any one of: an IMSI, an S-TMSI, a UE resume ID (resumeID) for identifying an INACTIVE state, a C-RNTI, a random number, and a fixed value (such as "0"). Obviously, it will be appreciated that the specific values for the random number and the fixed value are not specifically limited.

In an embodiment of the present disclosure, the information of the second location includes arbitrary combination of one or more of: the frequency location information and the spatial location information.

In an embodiment of the present disclosure, the frequency location information includes arbitrary combination of one or more of: a BWP identifier, a SCS identifier, a frequency identifier, a frequency offset identifier, a bandwidth identifier, a PRB identifier and a PRB offset identifier (e.g., corresponding to the offset of a certain reference PRB (such as PRB of number 0) in the cell).

In an embodiment of the present disclosure, the spatial location information includes arbitrary combination of one or more of: a reference signal identifier, a SSB Identifier, a CSI-RS identifier, a beam identifier, a beam pair identifier, and a transmission node identifier.

Step 602, determining the information of the first location on which the UE camps or receives the paging message;

It should be noted that, the order of Step 601 and Step 602 is not specifically limited in the embodiment of the present disclosure.

Step 603, sending the paging message on a corresponding BWP or beam according to the information of the first location.

For example: sending the paging message on a corresponding frequency location and/or spatial location according to the frequency location information and/or the spatial location information corresponding to a location on which the UE camps or receives the paging message.

In an embodiment of the present disclosure, Step 602 may determine the information of the first location in the manners as follows (including manner I, manner II, manner III and manner IV). In manners I and II, the information of the first location is the frequency location information of a BWP to camp or to receive the paging message thereon; in manners III and IV, the information of the first location is the spatial location information of a beam to camp or to receive the paging message thereon.

Manner I, calculating frequency location information of one or more BWPs on which the UE camps or receives the paging message, according to one or more of: a UE identity, a paging cycle of UE, the number of BWPs which allow camping or sending the paging message thereon, and a camping weight or a paging weight of each BWP; for example, the frequency location information of the BWP may be the BWP identifier.

Example 1: the identifier n ($0 \le n \le (Nn-1)$) of the BWP for camping or receiving the paging message is the minimum from the values of n that satisfy the following formula:

$$(\text{floor}(UE\_ID/(N \times Ns)) \bmod W) < (W(0)+W(1)+ \ldots +W(n))$$

where, UE_ID: IMSI mod x (e.g., x=1024, x is configured by network or agreed by protocol);

Nn−1: the total number of the BWPs in the cell which allow camping or sending the paging message thereon minus 1;

W(i): the camping weight or the paging weight of each BWP (BWP_i), which may be configured by network side or agreed by protocol;

W: the total camping weight or total paging weight of all the BWPs in the cell which allow camping or sending the paging message thereon, i.e., $W=W(0)+W(1)+ \ldots +W(Nn-1)$;

Nn: the total number of the BWPs in the cell which allow camping or sending the paging message thereon;

N: min(T, nB);

Ns: max(1, nB/T);

T: the paging cycle of the UE;

nB: any one of 4T, 2T, T, T/2, T/4, T/8, T/16, T/32, T/64, T/128, etc.; nB may be configured by network side or agreed by protocol.

Example 2: the identifier n ($0 \le n \le (Nn-1)$) of the BWP for camping or receiving the paging message is the minimum from the values of n that satisfy the following formula:

$$(\text{floor}(UE\_ID/(N \times Ns)) \bmod Nn) < (n+1);$$

Nn−1: the total number of the BWPs in the cell which allow camping or sending the paging message thereon minus 1;

UE_ID: the subscriber identity; it may be IMSI, S-TMSI, resumeID, C-RNTI, a random number, a fixed value, etc.;

N: min(T, nB);

Ns: max(1, nB/T);

T: the paging cycle of the UE;

nB: any one of 4T, 2T, T, T/2, T/4, T/8, T/16, T/32, T/64, T/128, etc.; nB may be configured by network side or agreed by protocol.

Example 3: the identifier n ($0 \le n \le (Nn-1)$) of the BWP for camping or receiving the paging message is the minimum from the values of n that satisfy the following formula:

$$(UE\_ID \bmod Nn) < (n+1);$$

where, Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

Nn: the total number of the BWPs in the cell which allow camping or sending the paging message thereon.

Example 4: the identifier n ($0 \le n \le (Nn-1)$) of the BWP for camping or receiving the paging message is a value of n that satisfies the following formula:

$$(\text{floor}(UE\_ID/(N \times Ns)) \bmod Nn) = n;$$

where, Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

Nn: the total number of the BWPs in the cell which allow camping or sending the paging message thereon;

N: min(T, nB);

Ns: max(1, nB/T);

T: the paging cycle of the UE;

nB: it is any one of 4T, 2T, T, T/2, T/4, T/8, T/16, T/32, T/64, T/128, etc.; nB may be configured by network side or agreed by protocol.

Example 5: the identifier n (0≤n≤(Nn−1)) of the BWP for camping or receiving the paging message is a value of n that satisfies the following formula:

(UE_ID mod $Nn$)=$n$;

where, Nn−1: the total number of the BWPs in the cell which allow camping or sending the paging message thereon minus 1;

UE_ID: the subscriber identity; UE_ID may be IMSI, S-TMSI, resumeID, C-RNTI, a random number, a fixed value, etc.;

Nn: the total number of the BWPs in the cell which allow camping or sending the paging message thereon.

Manner II, selecting randomly frequency location information of a BWP from frequency location information of multiple BWPs which allow camping or sending the paging message thereon, as the frequency location information of the BWP on which the UE camps or receives the paging message.

Example: the identifier n (0≤n≤(Nn−1)) of the BWP for camping or receiving the paging message is selected by the UE from Nn BWPs randomly, where Nn is the total number of the BWPs in the cell which allow camping or sending the paging message thereon.

Manner III, calculating spatial location information of one or more beams on which the UE camps or receives the paging message, according to one or more of: the UE identity, the paging cycle of UE, the number of beams which allow camping or sending the paging message thereon, and a camping weight or a paging weight of each beam.

Example 1: the identifier m (0≤m≤(Nm−1)) of the beam for camping or receiving the paging message is the minimum from the values of m that satisfy the following formula:

(floor(UE_ID/($N$×$Ns$))mod $W$)<($W$(0)+$W$(1)+ . . . +$W$($m$))

where, UE_ID: IMSI mod x (e.g., x=1024, x is configured by network or agreed by protocol);

Nm−1: the total number of the beams in the cell which allow camping or sending the paging message thereon minus 1;

W(i): the camping weight or the paging weight of each beam (beam_i), which may be configured by network side or agreed by protocol;

W: the total camping weight or total paging weight of all the beams in the cell which allow camping or sending the paging message thereon, i.e., W=W(0)+W(1)+ . . . +W(Nm−1);

Nm: the total number of the beams in the cell which allow camping or sending the paging message thereon;

N: min(T, mB);

Ns: max(1, mB/T);

T: the paging cycle of the UE;

mB: it is any one of 4T, 2T, T, T/2, T/4, T/8, T/16, T/32, T/64, T/128, etc.; mB may be configured by network side or agreed by protocol.

Example 2: the identifier m (0≤m≤(Nm−1)) of the beam for camping or receiving the paging message is the minimum from the values of m that satisfy the following formula:

(floor(UE_ID/($N$×$Ns$))mod $Nm$)<($m$+1);

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

N: min(T, mB);

Ns: max(1, mB/T);

T: the paging cycle of the UE;

mB: it is any one of 4T, 2T, T, T/2, T/4, T/8, T/16, T/32, T/64, T/128, etc.; mB may be configured by network side or agreed by protocol.

Example 3: the identifier m (0≤m≤(Nm−1)) of the beam for camping or receiving the paging message is the minimum from the values of m that satisfy the following formula:

(UE_ID mod $Nm$)<($m$+1);

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

Nm: the total number of the beams in the cell which allow camping or sending the paging message thereon.

Example 4: the identifier m (0≤m≤(Nm−1)) of the beam for camping or receiving the paging message is a value of m that satisfies the following formula:

(floor(UE_ID/($N$×$Ns$))mod $Nm$)=$m$;

where, Nm−1: the total number of the beams in the cell which allow camping or sending the paging message thereon minus 1;

UE_ID: the subscriber identity; UE_ID may be IMSI, S-TMSI, resumeID, C-RNTI, a random number, a fixed value, etc.;

Nm: the total number of the beams in the cell which allow camping or sending the paging message thereon;

N: min(T, mB);

Ns: max(1, mB/T);

T: the paging cycle of the UE;

mB: it is any one of 4T, 2T, T, T/2, T/4, T/8, T/16, T/32, T/64, T/128, etc.; mB may be configured by network side or agreed by protocol.

Example 5: the identifier m (0≤m≤(Nm−1)) of the beam for camping or receiving the paging message is a value of m that satisfies the following formula:

(UE_ID mod $Nm$)=$m$;

where, Nm−1: the total number of the beams in the cell which allow camping or sending the paging message thereon minus 1;

UE_ID: the subscriber identity; it may be IMSI, S-TMSI, resumeID, C-RNTI, a random number, a fixed value, etc.;

Nm: the total number of the beams in the cell which allow camping or sending the paging message thereon.

Manner IV, selecting randomly spatial location information of a beam from spatial location information of multiple beams which allow camping or sending the paging message thereon, as the spatial location information of the beam on which the UE camps or receives the paging message.

Example: the identifier m (0≤m≤(Nm−1)) of the beam for camping or receiving the paging message is selected by the UE from Nm beams randomly, where Nm is the total number of the beams in the cell which allow camping or sending the paging message thereon.

In this way, it can be achieved that the network side sends a paging message on multiple different BWPs or beams in a cell, and allocates different UEs to different BWPs or beams to camp or receive the paging message thereon, thereby balancing the paging message sending load.

An embodiment of the present disclosure further provides a user equipment. Since the principle of solving the problem by the user equipment is similar to that of the methods for determining paging location or camping location in the embodiments of the present disclosure, the implementation of the user equipment may refer to the implementation of the methods. The repetition will not be described.

Figure 7:
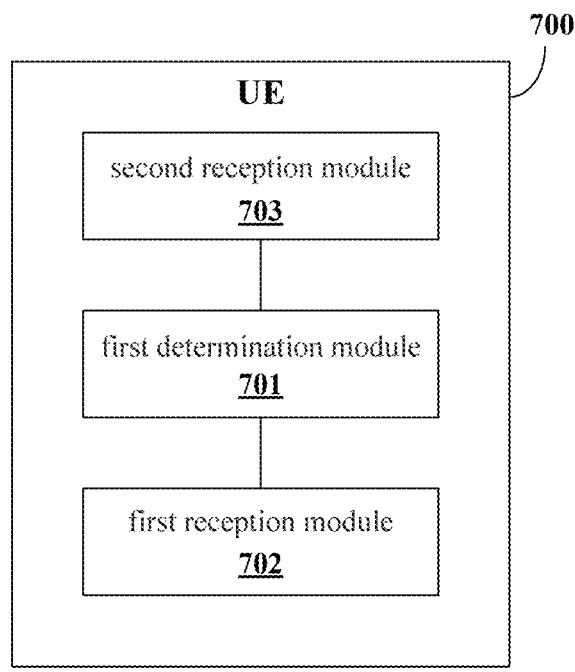
FIG. 7 is a first structural diagram of a UE according to an embodiment of the present disclosure.

Referring to FIG. 7, it shows a structure of a UE 700 according to an embodiment of the present disclosure. The UE 700 includes:

a first determination module 701 configured to determine information of a first location on which the UE camps or receives a paging message, wherein the information of the first location indicates a location of a BWP or a beam; and a first reception module 702 configured to camp on or receive the paging message on a corresponding BWP or beam according to the information of the first location.

With continued reference to FIG. 7, in the embodiment of the present disclosure, optionally, the UE 700 further includes: a second reception module 703, which is configured to receive assistance information sent by a network-side device; the first determination module 701 is further configured to determine the information of the first location on which the UE camps or receives the paging message according to the assistance information.

In the embodiment of the present disclosure, optionally, the second reception module 703 is further configured to receive a broadcast message sent by the network-side device. The broadcast message includes the assistance information; or, the second reception module 703 is further configured to receive an dedicated message sent by the network-side device. The dedicated message includes the assistance information.

In the embodiment of the present disclosure, optionally, the first determination module 701 is further configured to calculate frequency location information of one or more BWPs on which the UE camps or receives the paging message, according to one or more of: a UE identity, a paging cycle of UE, the number of BWPs which allow camping or sending the paging message thereon, and a camping weight or a paging weight of each BWP; or the first determination module 701 is further configured to select randomly frequency location information of a BWP from frequency location information of multiple BWPs which allow camping or sending the paging message thereon, as the frequency location information of the BWP on which the UE camps or receives the paging message.

In the embodiment of the present disclosure, optionally, the first determination module 701 is further configured to calculate spatial location information of one or more beams on which the UE camps or receives the paging message, according to one or more of: the UE identity, the paging cycle of UE, the number of beams which allow camping or sending the paging message thereon, and a camping weight or a paging weight of each beam; or the first determination module 701 is further configured to select randomly one piece of spatial location information from spatial location information of multiple beams which allow camping or sending the paging message thereon, as the spatial location information of the beam on which the UE camps or receives the paging message.

In the embodiment of the present disclosure, optionally, the assistance information includes information of a second location which allows camping or sending the paging message thereon.

In the embodiment of the present disclosure, optionally, the assistance information further includes arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

In the embodiment of the present disclosure, optionally, the BWP which allows camping or sending the paging message thereon is arbitrary combination of one or more of: a BWP containing a SSB defined by a cell, a BWP for initial cell access, and a BWP containing system information.

In the embodiment of the present disclosure, optionally, the UE identity includes any one of: an IMSI, an S-TMSI, a UE resume ID (resumeID), a C-RNTI, a random number, and a fixed value.

In the embodiment of the present disclosure, optionally, the information of the first location includes arbitrary combination of one or more of: the frequency location information and the spatial location information.

In the embodiment of the present disclosure, optionally, the information of the second location includes arbitrary combination of one or more of: the frequency location information and the spatial location information.

In the embodiment of the present disclosure, optionally, the frequency location information includes arbitrary combination of one or more of: a BWP identifier, a SCS identifier, a frequency identifier, a frequency offset identifier, a bandwidth identifier, a PRB identifier and a PRB offset identifier.

In the embodiment of the present disclosure, optionally, the spatial location information includes arbitrary combination of one or more of: a reference signal identifier, a synchronization signal identifier, a CSI-RS identifier, a beam identifier, a beam pair identifier, and a transmission node identifier.

The user equipment provided in the embodiment of the present disclosure can perform the above method embodiment, and has similar principle and technical effects, which will not be repeated in the embodiment here.

An embodiment of the present disclosure further provides a network-side device. Since the principle of solving the problem by the network-side device is similar to that of the methods for determining paging location or camping location in the embodiments of the present disclosure, the implementation of the network-side device may refer to the implementation of the methods. The repetition will not be described.

Figure 9:
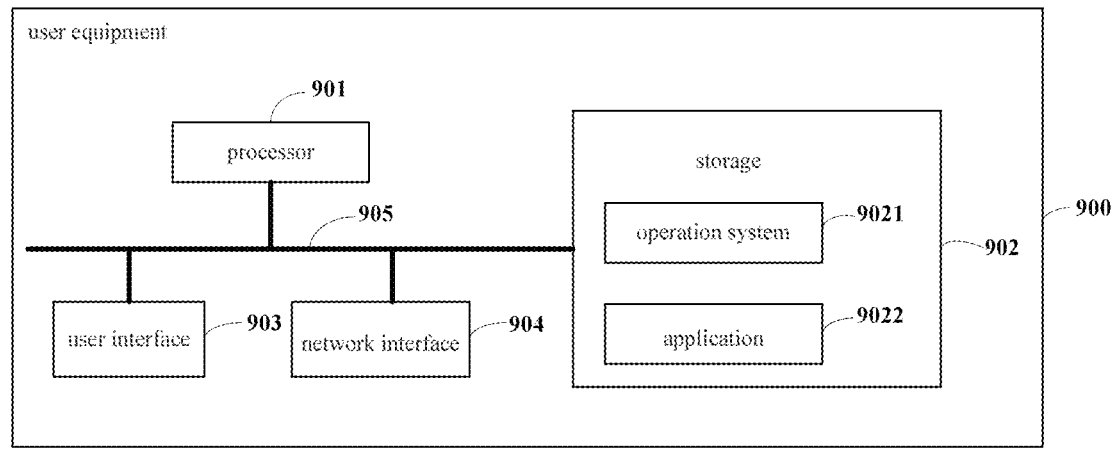
FIG. 9 is a second structural diagram of a UE according to an embodiment of the present disclosure.

Referring to FIG. 9, it shows a structure of a network-side device 800. The network-side device 800 includes:

a second determination module 801 configured to determine information of a first location on which a UE camps or receives a paging message, wherein the information of the first location indicates a location of a bandwidth part (BWP) or a beam; and a first sending module 802 configured to send the paging message on a corresponding BWP or beam according to the information of the first location.

Figure 8:
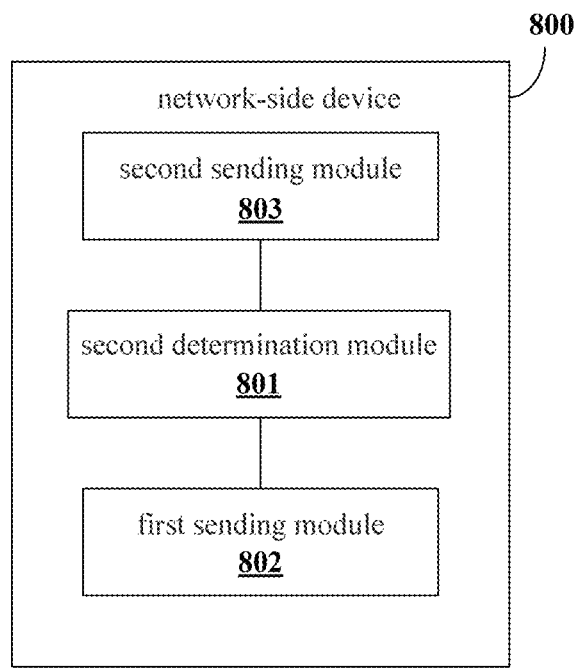
FIG. 8 is a first structural diagram of a network-side device according to an embodiment of the present disclosure.

With continued reference to FIG. 8, in the embodiment of the present disclosure, optionally, the network-side device 800 further includes: a second sending module 803 configured to send assistance information to the UE, the assistance information being used by the UE to determine the information of the first location of a BWP or beam to camp or to receive the paging message thereon.

In the embodiment of the present disclosure, optionally, the second sending module 803 is further configured to send a broadcast message to the UE. The broadcast message includes the assistance information; or, the second sending module 803 is further configured to send an dedicated message to the UE. The dedicated message includes the assistance information In the embodiment of the present disclosure, optionally, the second determination module 801 is further configured to calculate frequency location information of one or more BWPs on which the UE camps or receives the paging message, according to one or more of: a UE identity, a paging cycle of UE, the number of BWPs which allow camping or sending the paging message thereon, and a camping weight or a paging weight of each BWP; or the second determination module 801 is further configured to select randomly frequency location information of a BWP from frequency location information of multiple BWPs which allow camping or sending the paging message thereon, as the frequency location information of the BWP on which the UE camps or receives the paging message.

In the embodiment of the present disclosure, optionally, the second determination module 801 is further configured to calculate spatial location information of one or more beams on which the UE camps or receives the paging message, according to one or more of: the UE identity, the paging cycle of UE, the number of beams which allow camping or sending the paging message thereon, and a camping weight or a paging weight of each beam; or the second determination module 801 is further configured to select randomly one piece of spatial location information from spatial location information of multiple beams which allow camping or sending the paging message thereon, as the spatial location information of the beam on which the UE camps or receives the paging message.

In the embodiment of the present disclosure, optionally, the assistance information includes information of a second location which allows camping or sending the paging message thereon.

In the embodiment of the present disclosure, optionally, the assistance information further includes arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

In the embodiment of the present disclosure, optionally, the BWP which allows camping or sending the paging message thereon is arbitrary combination of one or more of: a BWP containing a SSB defined by a cell, a BWP for initial cell access, and a BWP containing system information.

In the embodiment of the present disclosure, optionally, the UE identity includes any one of: an IMSI, an S-TMSI, a UE resume ID (resumeID), a C-RNTI, a random number, and a fixed value.

In an embodiment of the present disclosure, optionally, the information of the first location includes arbitrary combination of one or more of: the frequency location information and the spatial location information.

In the embodiment of the present disclosure, optionally, the information of the second location includes arbitrary combination of one or more of: the frequency location information and the spatial location information.

In the embodiment of the present disclosure, optionally, the frequency location information includes arbitrary combination of one or more of: a BWP identifier, a SCS identifier, a frequency identifier, a frequency offset identifier, a bandwidth identifier, a PRB identifier and a PRB offset identifier.

In the embodiment of the present disclosure, optionally, the spatial location information includes arbitrary combination of one or more of: a reference signal identifier, a synchronization signal identifier, a CSI-RS identifier, a beam identifier, a beam pair identifier, and a transmission node identifier.

The network-side device provided in the embodiment of the present disclosure can perform the above method embodiment, and has similar principle and technical effects, which will not be repeated in the embodiment here.

As shown in FIG. 9, the user equipment 900 includes at least one processor 901, a storage 902, at least one network interface 904 and a user interface 903. Various components in the user equipment 900 are coupled together via a bus system 905. It will be appreciated that, the bus system 905 is used to realize connection and communication between these components. In addition to a data bus, the bus system 905 also includes a power bus, a control bus, and a status signal bus. However, for the sake of clarity, various buses are marked as the bus system 905 in FIG. 9.

The user interface 903 may include a display, a keyboard, or a pointing device (for example, a mouse, a trackball, a touch pad, or a touch screen, etc.).

It will be appreciated that the storage 902 in the embodiment of the present disclosure may be a volatile memory or a non-volatile memory, or may include both the volatile memory and the non-volatile memory. Among them, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example but not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The storage 902 of the system and method described in the embodiments of the present disclosure is intended to include, but is not limited to, these and any other suitable types of storages.

In some embodiments, the storage 902 stores the following elements, executable modules or data structures, or their subsets, or their extended sets: an operating system 9021 and an application 9022.

The operating system 9021 includes various system programs, such as a framework layer, a core library layer, and a driver layer, etc., for implementing various basic services and processing hardware-based tasks. The application 9022 includes various applications, such as a media player, a browser, etc., for implementing various application services. The program for implementing the methods of the embodiments of the present disclosure may be included in the application 9022.

In an embodiment of the present disclosure, the programs or instructions stored in the storage 902 (specifically, which may be the programs or instructions stored in the application 9022) are called and executed to implement the following steps: determining information of a first location on which the UE camps or receives a paging message, wherein the information of the first location indicates a location of a bandwidth part (BWP) or a beam; and camping on or receiving the paging message on a corresponding BWP or beam according to the information of the first location.

The user equipment provided by the embodiment of the present disclosure can implement the above method embodiments, and the principle and technical effects thereof are similar to those of the methods. Thus, the repetition will not be described in the embodiment.

Figure 10:
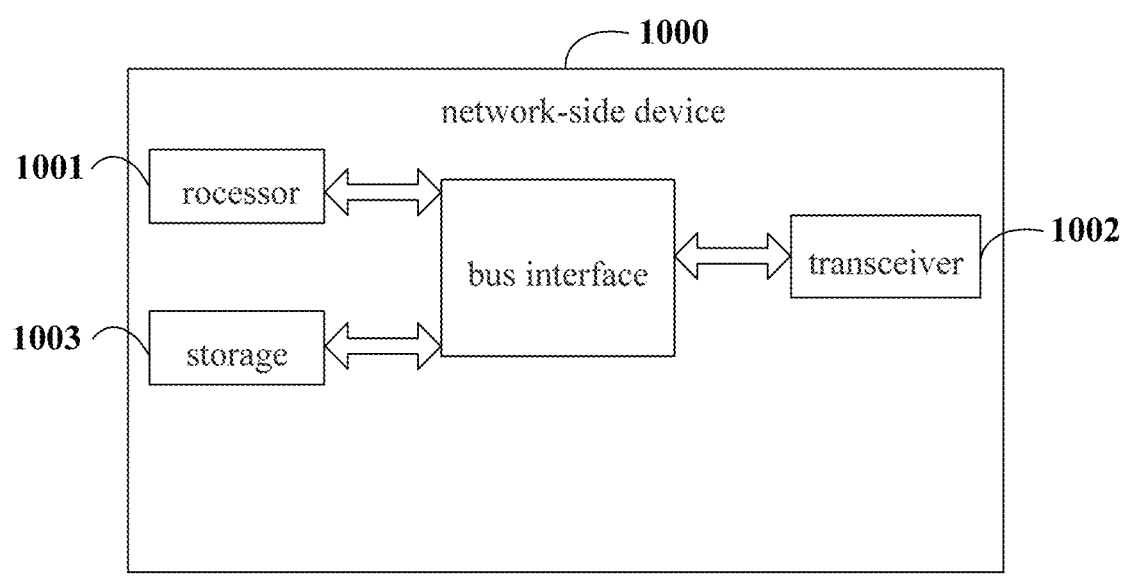
FIG. 10 is a second structural diagram of a network-side device according to an embodiment of the present disclosure.

Referring to FIG. 10, it is a structural diagram of a network-side device applied in the embodiment. As shown in FIG. 10, the network-side device 1000 includes a processor 1001, a transceiver 1002, a storage 1003 and a bus interface, wherein:

in the embodiment of the present disclosure, the network-side device 1000 further includes a computer program stored on the storage 1003 and capable of running on the processor 1001. When executed by the processor 1001, the computer program implements the following steps: determining information of a first location on which a UE camps or receives a paging message, wherein the information of the first location indicates a location of a bandwidth part (BWP) or a beam; and sending the paging message on a corresponding BWP or beam according to the information of the first location.

In FIG. 10, the bus architecture may include any number of interconnected buses and bridges, which are linked together specifically by various circuits such as one or more processors represented by the processor 1001 and the storage represented by the storage 1003. The bus architecture can also link various other circuits such as peripheral devices, voltage regulators, and power management circuits, etc., which are well known in the art, and therefore, they will not be further described herein. The bus interface provides interfaces. The transceiver 1002 may be a plurality of elements, including a transmitter and a receiver, and provides units for communicating with various other devices on a transmission medium.

The processor 1001 is responsible for managing the bus architecture and general processing, and the storage 1003 may store data used by the processor 1001 when performing operations.

The network-side device provided by the embodiment of the present disclosure can implement the above method embodiments, and the principle and technical effects thereof are similar to those of the methods. Thus, the repetition will not be described in the embodiment.

The steps of the methods or algorithms described in conjunction with the disclosed contents of the present disclosure may be implemented by hardware, or by a processor executing software instructions. The software instructions may be composed of corresponding software modules, which may be stored in RAM, flash memory, ROM, EPROM, EEPROM, registers, hard disk, mobile hard disk, read-only optical disk, or any other form of storage medium well known in the art. An exemplary storage medium is coupled to the processor so that the processor can read information from the storage medium and can write information to the storage medium. Obviously, the storage medium may also be a component of the processor. The processor and the storage medium may be located in an ASIC. In addition, the ASIC may be located in a core network interface device. Obviously, the processor and the storage medium may also exist as discrete components in the core network interface device.

Those skilled in the art should realize that in one or more of the above examples, the functions described in the present disclosure may be implemented by hardware, software, firmware, or arbitrary combination thereof. When implemented in software, these functions can be stored in a computer-readable medium or transmitted as one or more instructions or codes on a computer-readable medium. The computer-readable medium includes the computer storage medium and the communication medium, and the communication medium includes any medium that facilitates transferring a computer program from one place to another. The storage medium may be any available medium that can be accessed by a general-purpose or special-purpose computer.

The specific embodiments described above further describe the purpose, technical solutions and beneficial effects of the present disclosure in detail. It will be appreciated that the above are only specific embodiments of the present disclosure and are not intended to limit the scope of the present disclosure. Any modifications, equivalent alternatives, improvements, etc., based on the technical solutions of the present disclosure, should be included in the protective scope of the present disclosure.

Those skilled in the art should understand that the embodiments of the present disclosure may be provided as a method, a system, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program codes therein.

The embodiments of the present disclosure are described with reference to flowcharts and/or block diagrams of methods, devices (systems), and computer program products according to the embodiments of the present disclosure. It will be appreciated that each process and/or block in the flowcharts and/or block diagrams, and combinations of processes and blocks in the flowcharts and block diagrams may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device generate means for implementing the functions specified in one or more of the processes in the flowcharts and/or one or more of the blocks in the block diagrams.

These computer program instructions may also be stored in a computer-readable storage capable of directing a computer or other programmable data processing device to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing devices, so that a series of operation steps can be performed on the computer or other programmable devices to produce a computer-implemented process, so that the instructions executed on the computer or other programmable device provide the steps for implementing the functions specified in one or more of the processes in the flowcharts and/or one or more of the blocks in the block diagrams.

Obviously, those skilled in the art can make various modifications and variations to the embodiments of the present disclosure without departing from the spirit and scope of the present disclosure. Thus, if these modifications and variations of the embodiments of the present disclosure fall within the scope of the claims of the present disclosure and their equivalent technologies, the present disclosure also intends to include these modifications and variations.

What is claimed is:

1. A network-side device, comprising:
a second determination module configured to determine information of a first location on which a UE camps or receives a paging message, wherein the information of the first location indicates a location of a bandwidth part (BWP) or a beam; and
a first sending module configured to send the paging message on a corresponding BWP or beam according to the information of the first location;
wherein the second determination module is further configured to calculate frequency location information of one or more BWPs on which the UE camps or receives the paging message, according to one or more of: a UE identity, a paging cycle of UE, a number of BWPs which allow camping or sending the paging message thereon, and a camping weight or a paging weight of each BWP; or the second determination module is further configured to select randomly frequency location information of a BWP from frequency location information of multiple BWPs which allow camping or sending the paging message thereon, as the frequency location information of the BWP on which the UE camps or receives the paging message; or
the second determination module is further configured to calculate spatial location information of one or more beams on which the UE camps or receives the paging message, according to one or more of: the UE identity, the paging cycle of UE, a number of beams which allow camping or sending the paging message thereon, and a camping weight or a paging weight of each beam; or the second determination module is further configured to select randomly one piece of spatial location information from spatial location information of multiple beams which allow camping or sending the paging message thereon, as the spatial location information of the beam on which the UE camps or receives the paging message.

2. The network-side device according to claim 1, further comprising:
a second sending module configured to send assistance information to the UE, the assistance information being used by the UE to determine the information of the first location of a BWP or beam on which the UE camps or receives the paging message, wherein the assistance information is contained in a broadcast message or an dedicated message.

3. The network-side device according to claim 1, wherein the assistance information comprises: information of a second location which allows camping or sending the paging message thereon.

4. The network-side device according to claim 3, wherein the assistance information further comprises arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

5. The network-side device according to claim 3, wherein the BWP which allows camping or sending the paging message thereon is arbitrary combination of one or more of: a BWP containing a synchronization signal block defined by a cell, a BWP for initial cell access, and a BWP containing system information.

6. The network-side device according to claim 4, wherein the UE identity comprises any one of: an international mobile subscriber identity, a system architecture evolution temporary mobile station identifier, a UE resume identifier, a cell radio network temporary identifier, a random number, and a fixed value.

7. The network-side device according to claim 3, wherein the information of the first location comprises arbitrary combination of one or more of: frequency location information and spatial location information;
the information of the second location comprises arbitrary combination of one or more of: frequency location information and spatial location information.

8. The network-side device according to claim 7, wherein the first sending module is further configured to send the paging message on a corresponding frequency location and/or spatial location according to frequency location information and/or the spatial location information corresponding to a location on which the UE camps or receives the paging message.

9. A non-transitory computer readable storage medium having a computer program stored thereon, the computer program performing, when executed by a processor, steps of a method for determining paging location or camping location, applied to a user equipment (UE), comprising:
determining information of a first location on which the UE camps or receives a paging message, wherein the information of the first location indicates a location of a bandwidth part (BWP) or a beam; and
camping on or receiving the paging message on a corresponding BWP or beam according to the information of the first location;
wherein the determining the information of the first location on which the UE camps or receives a paging message comprises:
receiving assistance information sent by a network-side device, the assistance information being contained in a broadcast message or an dedicated message; and
determining the information of the first location on which the UE camps or receives the paging message according to the assistance information;
wherein the determining the information of the first location on which the UE camps or receives the paging message according to the assistance information comprises:
calculating frequency location information of one or more BWPs on which the UE camps or receives the paging message, according to one or more of: a UE identity, a paging cycle of UE, a number of BWPs which allow camping or sending the paging message thereon, and a camping weight or a paging weight of each BWP; or selecting randomly frequency location information of a BWP from frequency location information of multiple BWPs which allow camping or sending the paging message thereon, as the frequency location information of the BWP on which the UE camps or receives the paging message; or calculating spatial location information of one or more beams on which the UE camps or receives the paging message, according to one or more of: the UE identity, the paging cycle of UE, a number of beams which allow camping or sending the paging message thereon, and a camping weight or a paging weight of each beam; or selecting randomly one piece of spatial location information from spatial location information of multiple beams which allow camping or sending the paging message thereon, as the spatial location information of the beam on which the UE camps or receives the paging message.

10. The non-transitory computer readable storage medium according to claim 9, wherein the assistance information comprises: information of a second location which allows camping or sending the paging message thereon.

11. The non-transitory computer readable storage medium according to claim 10, wherein the assistance information further comprises arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

12. The non-transitory computer readable storage medium according to claim 10, wherein the BWP which allows camping or sending the paging message thereon is arbitrary combination of one or more of: a BWP containing a synchronization signal block defined by a cell, a BWP for initial cell access, and a BWP containing system information.

13. The non-transitory computer readable storage medium according to claim 11, wherein the UE identity comprises any one of: an international mobile subscriber identity, a system architecture evolution temporary mobile station identifier, a UE resume identifier, a cell radio network temporary identifier, a random number, and a fixed value.

14. The non-transitory computer readable storage medium according to claim 11, wherein the information of the first location comprises arbitrary combination of one or more of: frequency location information and spatial location information;

the information of the second location comprises arbitrary combination of one or more of: frequency location information and spatial location information.

15. A non-transitory computer readable storage medium having a computer program stored thereon, the computer program performing, when executed by a processor, steps of a method for determining paging location or camping location, applied to a network-side device, comprising:

determining information of a first location on which a UE camps or receives a paging message, wherein the information of the first location indicates a location of a bandwidth part (BWP) or a beam; and sending the paging message on a corresponding BWP or beam according to the information of the first location;

wherein the determining information of the first location on which the UE camps or receives the paging message comprises:

calculating frequency location information of one or more BWPs on which the UE camps or receives the paging message, according to one or more of: a UE identity, a paging cycle of UE, a number of BWPs which allow camping or sending the paging message thereon, and a camping weight or a paging weight of each BWP; or selecting randomly frequency location information of a BWP from frequency location information of multiple BWPs which allow camping or sending the paging message thereon, as the frequency location information of the BWP on which the UE camps or receives the paging message; or calculating spatial location information of one or more beams on which the UE camps or receives the paging message, according to one or more of: the UE identity, the paging cycle of UE, a number of beams which allow camping or sending the paging message thereon, and a camping weight or a paging weight of each beam; or selecting randomly one piece of spatial location information from spatial location information of multiple beams which allow camping or sending the paging message thereon, as the spatial location information of the beam on which the UE camps or receives the paging message.

16. The non-transitory computer readable storage medium according to claim 15, wherein the method for determining paging location or camping location further comprises:

sending assistance information to the UE, the assistance information being used by the UE to determine the information of the first location of a BWP or beam on which the UE camps or receives the paging message, wherein the assistance information is contained in a broadcast message or an dedicated message.

17. The non-transitory computer readable storage medium according to claim 16, wherein the assistance information comprises: information of a second location which allows camping or sending the paging message thereon.

18. The non-transitory computer readable storage medium according to claim 17, wherein the assistance information further comprises arbitrary combination of one or more of: a camping weight of a BWP or a beam which allows camping thereon; a paging weight of a BWP or a beam which allows sending the paging message thereon; and a UE identity for calculating the information of the first location to camp thereon or to receive the paging message thereon.

19. The non-transitory computer readable storage medium according to claim 17, wherein the BWP which allows camping or sending the paging message thereon is arbitrary combination of one or more of: a BWP containing a synchronization signal block defined by a cell, a BWP for initial cell access, and a BWP containing system information.

20. The non-transitory computer readable storage medium according to claim 18, wherein the UE identity comprises any one of: an international mobile subscriber identity, a system architecture evolution temporary mobile station identifier, a UE resume identifier, a cell radio network temporary identifier, a random number, and a fixed value.

* * * * *